(12) United States Patent
Kanai et al.

(10) Patent No.: US 8,380,400 B2
(45) Date of Patent: Feb. 19, 2013

(54) CONTROL APPARATUS FOR VEHICLE AND METHOD FOR CONTROLLING VEHICLE

(75) Inventors: Osamu Kanai, Toyota (JP); Takahiko Tsutsumi, Toyota (JP); Ichiro Kitaori, Nagoya (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 13/257,552

(22) PCT Filed: Feb. 9, 2010

(86) PCT No.: PCT/JP2010/000776
§ 371 (c)(1),
(2), (4) Date: Sep. 19, 2011

(87) PCT Pub. No.: WO2010/109749
PCT Pub. Date: Sep. 30, 2010

(65) Prior Publication Data
US 2012/0010785 A1     Jan. 12, 2012

(30) Foreign Application Priority Data
Mar. 25, 2009   (JP) ................ 2009-073212

(51) Int. Cl.
*G06F 17/00* (2006.01)

(52) U.S. Cl. ......... 701/48; 701/518; 701/533; 74/473.3; 74/473.23; 74/523; 74/528; 74/535; 477/48; 477/99; 477/126; 188/5; 188/16; 188/158; 188/195; 134/18; 134/123; 180/421

(58) Field of Classification Search ............ 701/48, 701/518, 533; 74/473.3, 473.23, 523, 528, 74/535, 537; 477/48, 99, 126; 188/5, 16, 188/158, 195; 134/18, 123; 180/421
See application file for complete search history.

(56) References Cited

U.S. PATENT DOCUMENTS 4,815,341 A * 3/1989 Ohkubo et al. ............ 477/134
4,916,263 A * 4/1990 Ichigo ...................... 200/11 DA
4,991,700 A * 2/1991 Koga ........................ 192/220.3
(Continued)

FOREIGN PATENT DOCUMENTS

| JP | 4-69450 | 3/1992 |
|---|---|---|
| JP | 5-246266 | 9/1993 |
| JP | 2007-154964 | 6/2007 |
| JP | 4179388 | 9/2008 |
| JP | 2008-290562 | 12/2008 |
| JP | 2009-144833 | 7/2009 |

OTHER PUBLICATIONS

International Search Report in International Application No. PCT/JP2010/000776; Mailing Date: Jun. 2, 2010.
Notice of Grounds of Rejection for JP Appl. No. 2009-073212 dated Apr. 24, 2012.

*Primary Examiner* — James P. Trammell
*Assistant Examiner* — McDieunel Marc
(74) *Attorney, Agent, or Firm* — Finnegan, Henderson, Farabow, Garrett & Dunner, L.L.P.

(57) ABSTRACT

An HV-ECU performs a program including the steps of: determining whether or not the HV-ECU is in an auto-P execution state; determining whether or not a predetermined time period Tb has elapsed since an auto-P was requested; and permitting determination of the shifting operation if the HV-ECU is in the auto-P execution state and if it is determined that the predetermined time period Tb has elapsed since the auto-P was requested.

8 Claims, 6 Drawing Sheets

U.S. PATENT DOCUMENTS

| | | | | |
|---|---|---|---|---|
| 5,015,807 | A * | 5/1991 | Ishizuki et al. | 200/61.88 |
| 5,197,344 | A * | 3/1993 | Maier et al. | 74/335 |
| 5,428,977 | A * | 7/1995 | Knape | 70/247 |
| 7,178,619 | B2 * | 2/2007 | Oono | 180/65.285 |
| 8,047,963 | B2 * | 11/2011 | Inoue | 477/197 |
| 2003/0144112 | A1 * | 7/2003 | Burgbacher et al. | 477/99 |
| 2007/0129210 | A1 | 6/2007 | Kimura et al. | |
| 2009/0176619 | A1 * | 7/2009 | Inoue | 477/96 |

\* cited by examiner

CONTROL APPARATUS FOR VEHICLE AND METHOD FOR CONTROLLING VEHICLE

CROSS-REFERENCE TO RELATED APPLICATIONS

This application is a national phase application of International Application No. PCT/JP2010/000776, filed Feb. 9, 2010, and claims the priority of Japanese Application No. 2009-073212, filed Mar. 25, 2009, the contents of both of which are incorporated herein by reference.

TECHNICAL FIELD

The present invention relates to control of a vehicle on which a parking lock mechanism and a shift position selecting mechanism driven by an actuator are mounted. In particular, the present invention relates to control of a vehicle when an operation of selecting a parking position that is automatically performed together with shutoff control of a power supply is not completed.

BACKGROUND ART

Conventionally, a vehicle is provided with a parking lock mechanism for limiting the rotation of a drive wheel of the vehicle when a parking position is selected. The parking lock mechanism includes a parking lock gear having a plurality of gear teeth provided at a shaft that is coupled to the drive wheel, and a parking lock pole having a protrusion that can mesh with the gear teeth. When the parking position is selected, the projecting shape meshes with a recess between the gear teeth, thereby bringing the parking lock mechanism to an effectively operating state.

In addition, a technique of automatically selecting the parking position when a power supply of the vehicle is shut off (that will also be described as "auto parking control" or simply as "auto-P" in the following description) is known. Thus, execution of the auto parking control brings the parking lock mechanism into operation, and the movement of the vehicle is limited.

As such a technique, Japanese Patent No. 4179388, for example, discloses a vehicle control apparatus that allows a circumstance in which a normal ending process can be performed to be ensured as rapidly as possible, even when the vehicle has rolled in a circumstance such as executing auto parking control on a hill. This vehicle control apparatus is, in a vehicle having a shift-by-wire parking mechanism that switches an output shaft of an automatic transmission between a locked state in which rotation is not possible, and an unlocked state in which rotation is possible, a control apparatus that executes an auto parking control that sets the parking mechanism to the locked state when a request to switch a vehicle electrical power source from an ignition on position to an ignition off position has been received and a vehicle stop condition has been established, and includes an ending process element that, after operation of the parking mechanism by the auto parking control, when the locked state has been established within a reference period, performs a normal ending process that stops a vehicle drive source and switches a vehicle electrical power source to an ignition off position, and when the locked state has not been established within the reference period, performs an abnormal ending process that stops the vehicle drive source and switches the vehicle electrical power source to an accessory position; and a support process element that, when an increase in vehicle speed is detected when the parking mechanism is operated by the auto parking control, performs a support process that prohibits operation of the parking mechanism and extends the reference period.

According to the vehicle control apparatus disclosed in the above publication, when the vehicle has rolled in the sort of circumstance in which auto parking control is executed on a hill, performance of the abnormal ending process in which the vehicle electrical power source is set to the accessory position can be avoided as much as possible. Accordingly, it is possible to avoid excessive mistakes or mistrust by the driver, for example, thus contributing to an improvement in reliability.

CITATION LIST

Patent Literature

PTL 1: Japanese Patent No. 4179388

SUMMARY OF INVENTION

Technical Problem

When the parking position is automatically selected at the time of shutoff of the power supply of the vehicle, selection of the shift position may be limited such that the driver's operation of changing the shift position is not accepted until the operation of selecting the parking position is completed.

The vehicle that has stopped on the hill and the like, however, may move after the operation of selecting the parking position starts. In this case, the rotation of the drive wheel does not result in the effectively operating state of the parking lock mechanism, and the operation of selecting the parking position is not completed in some cases. Thus, the driver's operation of selecting the shift position is not accepted unless the operation of selecting the parking position is completed, and the shift position suited to the driver's intention cannot be selected.

In the vehicle control apparatus disclosed in the above publication, such a problem is not taken into consideration at all and cannot be solved.

An object of the present invention is to provide a control apparatus for a vehicle and a method for controlling a vehicle that allow selection of a shift position suited to a driver's intention when a power supply is not shut off because an operation of selecting a parking position is not completed.

Solution to Problem

A control apparatus for a vehicle according to an aspect of the present invention is directed to a control apparatus for a vehicle including a drive wheel, a shift position selecting mechanism for selecting any one of a plurality of shift positions including a parking position by driving an actuator, a parking lock mechanism for limiting rotation of the drive wheel if the parking position is selected by the shift position selecting mechanism, electrical equipment, and a power supply for supplying electric power to the electrical equipment. This control apparatus includes: a power supply shutoff unit for shutting off electric power supply from the power supply to the electrical equipment if a shutoff instruction for the power supply is received and if the parking lock mechanism is in an effectively operating state; an actuator control unit for controlling the actuator such that the parking position is selected by the shift position selecting mechanism if the shutoff instruction is received; a prohibiting unit for prohibiting selection of a shift position different from the parking position based on an instruction from a driver, if the shutoff instruction is received; a lock determining unit for determining whether or not the parking lock mechanism is in the effectively operating state, if the shutoff instruction is received; and a permitting unit for permitting selection of the shift position different from the parking position based on the instruction from the driver, if selection of the shift position different from the parking position is prohibited by the prohibiting unit and if it is determined that the parking lock mechanism is not in the effectively operating state.

According to the present invention, even if the operation of selecting the parking position is not completed, the driver can select the shift position different from the parking position by permitting the selection of the shift position different from the parking position based on the driver's instruction if the selection of the shift position different from the parking position is prohibited and if it is determined that the parking lock mechanism is not in the effectively operating state. Thus, the driver can clear the parking position when the power supply is not shut off. Accordingly, there can be provided a control apparatus for a vehicle and a method for controlling a vehicle that allow the selection of the shift position suited to the driver's intention, when the power supply is not shut off because the operation of selecting the parking position is not completed.

Preferably, the permitting unit permits selection of the shift position different from the parking position based on the instruction from the driver, if the lock determining unit determines that the parking lock mechanism is not in the effectively operating state before a predetermined time period has elapsed since the shutoff instruction was received.

According to the present invention, the selection of the shift position different from the parking position based on the instruction from the driver is permitted, if the lock determining unit determines that the parking lock mechanism is not in the effectively operating state before the predetermined time period has elapsed since the shutoff instruction was received. As a result, even if the operation of selecting the parking position is not completed, the driver can select the shift position different from the parking position. Thus, the driver can clear the parking position when the power supply is not shut off.

More preferably, the control apparatus for the vehicle further includes a shutoff determining unit for determining whether or not the shutoff instruction for the power supply is received from the driver.

According to the present invention, the power supply can be shut off if the parking lock mechanism is in the effectively operating state when the shutoff instruction for the power supply from the driver is received.

More preferably, the lock determining unit determines that the parking lock mechanism is not in the effectively operating state, if control of the actuator is initiated by the actuator control unit and if a speed of the vehicle is greater than a predetermined speed.

According to the present invention, it can be determined that the parking lock mechanism is not in the effectively operating state, if control of the actuator is initiated and if the speed of the vehicle is greater than the predetermined speed.

DESCRIPTION OF EMBODIMENTS

Figure 1:
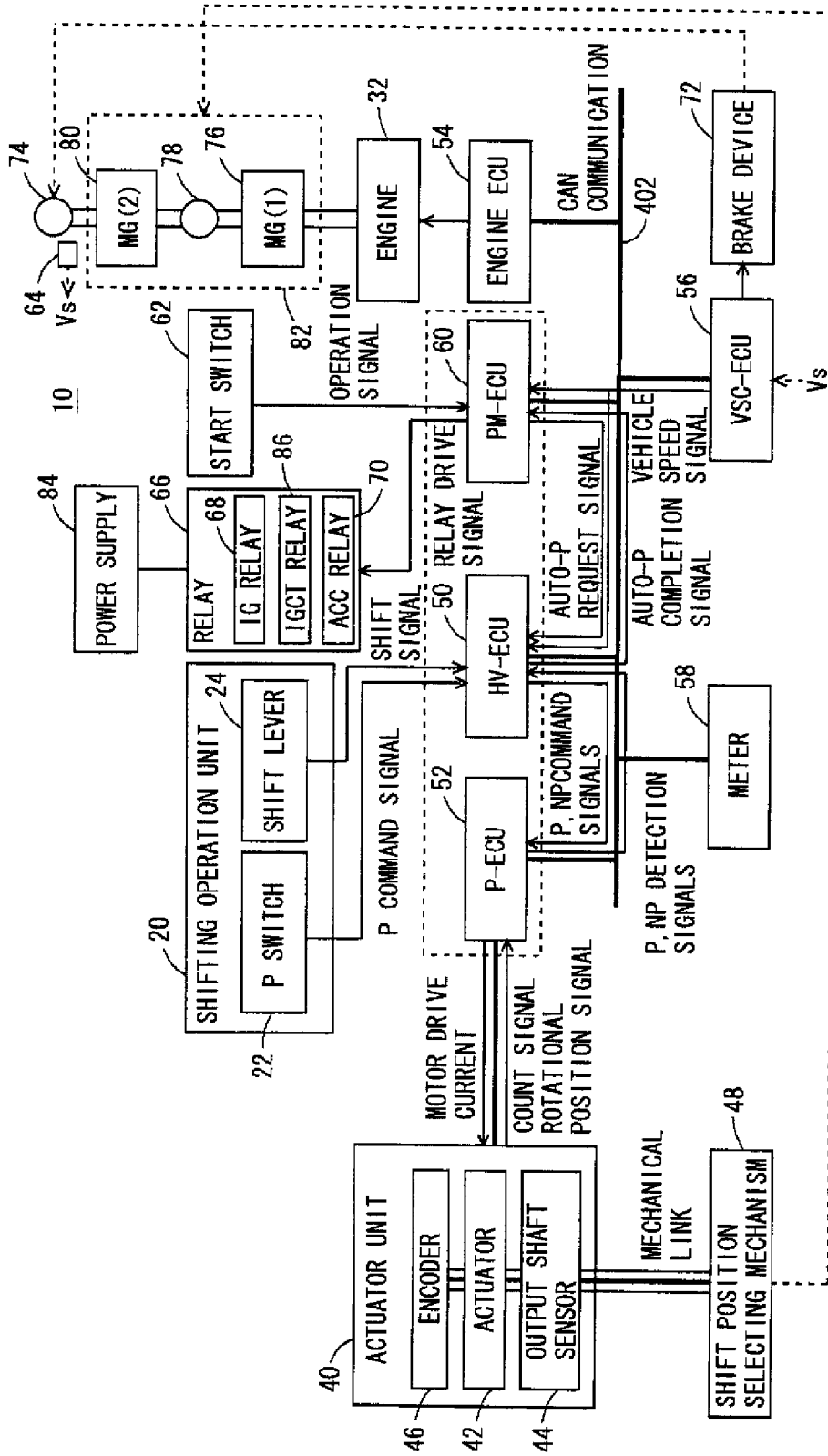
FIG. 1 shows a configuration of a vehicle on which a control apparatus for the vehicle according to the present embodiment is mounted.

Embodiments of the present invention will be described hereinafter with reference to the drawings. In the following description, the same components are represented by the same reference characters. The names and functions thereof are also the same. Thus, the detailed description thereof will not be repeated.

FIG. 1 shows a configuration of a vehicle 10 including a control apparatus for the vehicle according to the present embodiment. Although vehicle 10 according to the present embodiment is described by way of example as a hybrid vehicle using an engine and a motor as a drive source, vehicle 10 is not particularly limited thereto. For example, vehicle 10 may be a vehicle using an engine as a drive source, an electric vehicle or a fuel cell vehicle using a motor as a drive source, and the like. In addition, a transmission mounted on vehicle 10 is not limited to a transmission including a motor, but may be a transmission including a gear type or a continuously variable automatic transmission in addition to or instead of the motor, for example.

Vehicle 10 according to the present embodiment includes a shifting operation unit 20, an engine 32, an actuator unit 40, a shift position selecting mechanism 48, an HV (Hybrid Vehicle) -ECU (Electronic Control Unit) 50, a P-ECU 52, an engine ECU 54, a VSC (Vehicle Stability Control) -ECU 56, a meter 58, a PM-ECU 60, a start switch 62, a wheel speed sensor 64, a power supply relay 66, a brake device 72, a drive wheel 74, a transmission 82, and a power supply 84.

HV-ECU 50, P-ECU 52, engine ECU 54, VSC-ECU 56, meter 58, and PM-ECU 60 are mutually connected by a communication line (bus) 402, and data transfer between the vehicle-mounted equipment is implemented by the CAN (Controller Area Network) communication.

Shifting operation unit 20 includes a P switch 22 and a shift lever 24. Actuator unit 40 includes an actuator 42, an output shaft sensor 44 and an encoder 46. Power supply relay 66 includes an IG relay 68, an ACC relay 70 and an IGCT relay 86.

Shift position selecting mechanism 48 selects any one of a plurality of shift positions including a parking position by driving actuator 42. Shift position selecting mechanism 48 includes a shaft coupled to actuator 42. The shaft is provided with a detent plate that will be described hereinafter. The shaft is rotated by actuator 42.

P switch 22 and shift lever 24 function as a switching device for switching the shift position between the parking position (that will be described as "P position" hereinafter) and a shift position different from parking position (that will be described as "non-P position" hereinafter). Specifically, P switch 22 serves as a switching device for switching the shift position from the non-P position to the P position. Shift lever 24 serves as a switching device for switching the shift position from the P position to the non-P position, and also serves as a switching device for switching the shift position from a shift position different from parking position to another shift position different from parking position.

It is noted that the present invention is not limited thereto. Switching between the P position and the non-P position may only be possible. P switch 22 may serve as a switching device for switching between the P position and the non-P position, and shift lever 24 may serve as a switching device for switching between the P position and the non-P position.

P switch 22 includes an indicator for indicating the state of the switch to the driver and an input unit for accepting an instruction from the driver (both are not shown). The driver inputs an instruction to place the shift position in the P position, through the input unit. The input unit may be a momentary switch. A P command signal indicating the instruction from the driver that is accepted by the input unit is transmitted to HV-ECU 50.

For example, when the driver presses the input unit of P switch 22 with the non-P position selected, the P command signal is transmitted from P switch 22 to HV-ECU 50.

When receiving the P command signal from P switch 22, HV-ECU 50 transmits the P command signal to P-ECU 52. When receiving an auto-P request signal from PM-ECU 60 that will be described hereinafter, other than the P command signal from P switch 22, HV-ECU 50 transmits the P command signal to P-ECU 52.

When P-ECU 52 receives the P command signal from HV-ECU 50 and when the P position is not selected by shift position selecting mechanism 48, P-ECU 52 causes actuator 42 to be driven such that the P position is selected by shift position selecting mechanism 48. HV-ECU 50 or P-ECU 52 may cause an indicator of meter 58 (not shown) to indicate the current state of the shift position.

It is noted that, if a vehicle speed V is greater than or equal to a predetermined speed Va, the operation of selecting the P position may not be performed by stopping HV-ECU 50 from transmitting the P command signal to P-ECU 52 or stopping control of actuator 42 even if P-ECU 52 receives the P command signal.

Actuator 42 is a switched reluctance motor (that will be described as "SR motor" hereinafter), and receives an actuator control signal from P-ECU 52 and actuates shift position selecting mechanism 48.

Although actuator 42 is described as a rotationally driven motor in the present embodiment, actuator 42 is not particularly limited thereto. For example, actuator 42 may be a linearly driven motor. In addition, actuator 42 is not particularly limited to the motor.

Encoder 46 rotates integrally with actuator 42 and detects the situation of the rotation of the SR motor (e.g., the amount of rotation). Encoder 46 in the present embodiment is a rotary encoder that outputs signals of an A phase, a B phase and a Z phase. P-ECU 52 grasps the situation of the rotation of the SR motor by obtaining the signal output from encoder 46, and controls conduction in order to drive the SR motor.

Output shaft sensor 44 detects the rotational position of the shaft indicating the amount of actuation of actuator 42. Specifically, output shaft sensor 44 is connected to P-ECU 52 and transmits a signal indicating the rotation angle of the shaft (rotational position signal) to P-ECU 52.

P-ECU 52 detects the shift position based on the received signal indicating the rotational position. A predetermined range of an output value corresponding to each shift position is stored in a memory of P-ECU 52. P-ECU 52 determines the currently selected shift position by determining which range corresponding to each shift position the received signal indicating the rotation angle of the shaft corresponds to.

Shift lever 24 is a lever for selecting the shift position such as a forward drive position (that will be described as "D position" hereinafter), a rearward drive position (that will be described as "R position" hereinafter) and a neutral position (that will be described as "N position" hereinafter), or clearing the selection of the P position when the P position is selected. A shift signal indicating an instruction from the driver that is accepted by shift lever 24 is transmitted to HV-ECU 50. Shift lever 24 is provided with a shift position sensor for detecting the location of shift lever 24. The shift position sensor transmits, to HV-ECU 50, the shift signal indicating the shift position corresponding to the location of shift lever 24 operated by the driver. When receiving the shift signal indicating the instruction from the driver, HV-ECU 50 transmits an NP command signal for setting the shift position to the non-P position to P-ECU 52.

P-ECU 52 determines whether or not the P position is selected by shift position selecting mechanism 48, based on the rotational position and the amount of rotation of actuator 42 detected by output shaft sensor 44, encoder 46 and the like.

For example, if the current rotational position and the current amount of rotation of actuator 42 are the rotational position and the amount of rotation corresponding to the P position, P-ECU 52 determines that the P position is selected by shift position selecting mechanism 48. If the current rotational position and the current amount of rotation of actuator 42 are the rotational position and the amount of rotation corresponding to the non-P position, P-ECU 52 determines that the non-P position is selected by shift position selecting mechanism 48.

When determining that the P position is selected by shift position selecting mechanism 48, P-ECU 52 transmits, to HV-ECU 50, a signal indicating that the P position is selected (that will be described as "P detection signal" hereinafter).

In addition, if the non-P position is selected by shift position selecting mechanism 48, P-ECU 52 transmits, to HV-ECU 50, a signal indicating that the non-P position is selected (that will be described as "non-P detection signal" hereinafter).

Engine 32 is an internal combustion engine and conveys an output generated by combustion to transmission 82. The output of engine 32 is controlled by engine ECU 54 adjusting the opening degree of a throttle based on the amount of pressing of an accelerator pedal (not shown) and the like.

Transmission 82 includes a motor generator (that will be described as "MG" hereinafter) (1) 76, a power split device 78, an MG (2) 80, and a reduction gear (not shown).

Power split device 78 is, for example, a planetary gear mechanism, and splits the motive power generated by engine 32 into two paths, that is, drive wheel 74 (i.e., MG (2) 80) and MG (1) 76. The planetary gear mechanism includes a sun gear, a ring gear, a carrier, and a pinion gear. For example, the sun gear of the planetary gear mechanism is connected to MG (1) 76, and the carrier is connected to engine 32, and the ring gear is connected to MG (2) 80. It is noted that a transmission mechanism may be provided between the ring gear and MG (2) 80.

The planetary gear mechanism (planetary gear) is used as power split device 78 to divide the motive power of engine 32 into both drive wheel 74 and MG (1) 76. By controlling the rotation speed of MG (1) 76, power split device 78 also functions as a continuously variable transmission.

The reduction gear conveys the motive power generated at engine 32 or MG (2) 80 to drive wheel 74, or conveys, to engine 32 or MG (2) 80, the reaction force from a road surface to drive wheel 74.

The hybrid vehicle further includes a battery for traveling and an inverter (both are not shown).

The battery for traveling is a main power supply in which electric power for driving MG (1) 76 and MG (2) 80 is stored. The battery for traveling outputs DC electric power. In the present embodiment, the battery for traveling is a rechargeable secondary battery, e.g., a nickel hydride battery, a lithium ion battery or the like. It is noted that the battery for traveling is not limited thereto. The main power supply may be a power supply that can generate a DC voltage, e.g., a capacitor, a solar cell, a fuel cell and the like.

The inverter carries out conversion between a direct current of the battery for traveling and an alternating current of MG (1) 76 and MG (2) 80. The inverter receives DC electric power from the battery for traveling on the input side, converts the received DC electric power to AC electric power corresponding to a frequency command value, and outputs the converted AC electric power to MG (1) 76 and MG (2) 80. HV-ECU 50 controls the overall hybrid system to allow the most efficient traveling of vehicle 10.

HV-ECU 50 controls the equipment mounted on vehicle 10 in order to cause the vehicle to travel by using the motive power of MG (2) 80 in accordance with the state of vehicle 10, to cause the vehicle to travel by using the motive power of engine 32 and MG (2) 80, or to charge the battery for traveling by generating electric power by MG (1) 76 with the motive power of engine 32.

When IG relay 68 and ACC relay 70 are turned on in power supply relay 66, power supply 84 supplies electric power to the electrical equipment mounted on the vehicle. As a result, the system of vehicle 10 is activated. It is noted that a group of the electrical equipment that is supplied with the electric power when IG relay 68 is turned on is different from a group of the electrical equipment that is supplied with the electric power when ACC relay 70 is turned on. In addition, each group of the electrical equipment may have electrical equipment that belongs to both groups of the electrical equipment. The electrical equipment includes, for example, HV-ECU 50, PM-ECU 60, P-ECU 52, and VSC-ECU 56.

Wheel speed sensor 64 detects the rotation speed of drive wheel 74. It is noted that wheel speed sensor 64 may detect the rotation speed of a wheel (not shown) other than drive wheel 74. Wheel speed sensor 64 is connected to VSC-ECU 56, and transmits a signal indicating a detected wheel speed Vs to VSC-ECU 56. VSC-ECU 56 calculates vehicle speed V based on received wheel speed Vs. VSC-ECU 56 transmits a signal indicating calculated vehicle speed V to PM-ECU 60. It is noted that VSC-ECU 56 may transmit received wheel speed Vs to PM-ECU 60 and PM-ECU 60 may calculate vehicle speed V based on wheel speed Vs received from VSC-ECU 56.

It is noted that vehicle speed V may be calculated based on the rotation speed of an output shaft of transmission 82, instead of wheel speed Vs, or vehicle speed V may be directly detected by using the GPS (Global Positioning System) and the like.

It is noted that wheel speed sensor 64 may be directly connected to PM-ECU 60, or may be connected to at least any one of HV-ECU 50, P-ECU 52, engine ECU 54, and VSC-ECU 56.

Engine ECU 54 controls an output of engine 32 based on the state of engine 32 (e.g., the opening degree of the accelerator, the water temperature, the amount of air intake, and the like).

VSC-ECU 56 controls the hydraulic pressure of a brake in brake device 72 based on the behavior of the vehicle (e.g., wheel speed Vs) in addition to the amount of the operation of a brake pedal (not shown) and the master cylinder pressure.

Meter 58 has the state of the vehicle equipment, the state of the shift position and the like displayed thereon. Meter 58 is provided with a display unit (not shown) for displaying an instruction, a warning or the like to the driver issued by HV-ECU 50 or PM-ECU 60.

Brake device 72 causes the wheel to produce the braking force by using the negative pressure generated as a result of actuation of engine 32. For example, brake device 72 includes the brake pedal, a vacuum booster coupled to the brake pedal, a master cylinder coupled to the vacuum booster, a hydraulic circuit including a brake actuator and the like, and a disc brake provided at the wheel.

Start switch 62 is a switch for activating or stopping the system of vehicle 10 by the driver. When the driver operates start switch 62, an operation signal is transmitted from start switch 62 to PM-ECU 60.

When receiving the operation signal, PM-ECU 60 transmits a relay drive signal to power supply relay 66. The relay drive signal includes an IG relay drive signal for turning on or off IG relay 68, and an ACC relay drive signal for turning on or off ACC relay 70.

When receiving the operation signal while the system of vehicle 10 is active (i.e., IG relay 68 and ACC relay 70 included in power supply relay 66 are both ON), PM-ECU 60 determines that an instruction to stop the system of vehicle 10 is received, and executes shutoff control of power supply relay 66.

When determining that the instruction to stop the system of vehicle 10 is received, for example, PM-ECU 60 transmits the relay drive signal for turning off at least IG relay 68 to power supply relay 66.

In addition, when receiving the operation signal while the system of vehicle 10 is stopping (i.e., IG relay 68 and ACC relay 70 included in power supply relay 66 are both OFF), PM-ECU 60 determines that an instruction to activate the system of vehicle 10 is received, and executes conduction control of power supply relay 66.

When determining that the instruction to activate the system of vehicle 10 is received, for example, PM-ECU 60 transmits the relay drive signal to power supply relay 66 to turn on IG relay 68 and ACC relay 70.

It is noted that PM-ECU 60 may control power supply relay 66 based on the state of the operation of the brake pedal and/or the state of the operation of the shift lever in addition to the operation signal from start switch 62.

Based on the relay drive signal from PM-ECU 60, power supply relay 66 turns on only ACC relay 70, turns on IG relay 68 after turning on ACC relay 70, turns off only IG relay 68, or turns off ACC relay 70 after turning off IG relay 68. When IG relay 68 is turned on, the electric power is supplied to the vehicle-mounted equipment and the system of vehicle 10 is activated.

When IG relay 68 is turned on, IGCT relay 86 is turned on together with IG relay 68.

When IG relay 68 is turned off, IGCT relay 86 is turned off after a predetermined time period has elapsed since IG relay 68 was turned off. Specifically, an IG signal for control of P-ECU 52 is turned off after a predetermined time period Tc has elapsed since IG relay 68 was turned off. Furthermore, IGCT relay 86 is turned off after a pre-determined time period Td has elapsed since the IG signal for control was turned off. By turning off IGCT relay 86, the electric power supply from power supply 84 to P-ECU 52 and actuator 42 is shut off.

Figure 2:
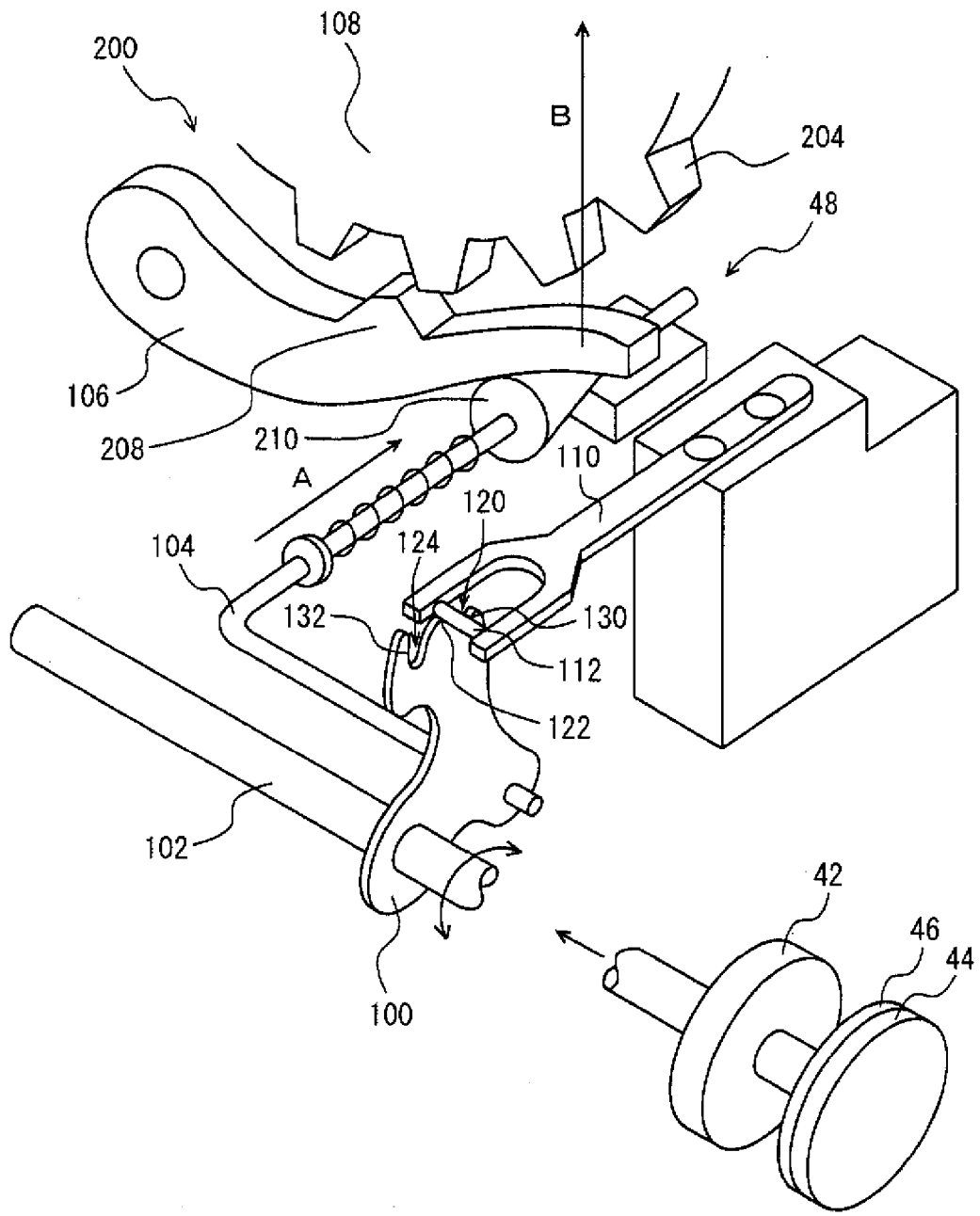
FIG. 2 shows a configuration of a shift position selecting mechanism in FIG. 1.

FIG. 2 shows a configuration of shift position selecting mechanism 48. Although the shift position is described hereinafter as the one that means the P position and the non-P position and that does not include each of the R, N and D positions in the non-P position, the shift position may include each of the R, N and D positions. In other words, although a configuration of the two positions, that is, the P position and the non-P position is described in the present embodiment, the present invention may have a configuration of the four positions, that is, the P position and the non-P position including each of the R, N and D positions.

Shift position selecting mechanism 48 includes a shaft 102 rotated by actuator 42, a detent plate 100 rotated with the rotation of shaft 102, a rod 104 operated with the rotation of detent plate 100, a detent spring 110 for limiting the rotation of detent plate 100 and fixing the shift position, a roller 112, and a parking lock mechanism 200.

Detent plate 100 rotates by driving actuator 42 and causes a change in the shift position.

Parking lock mechanism 200 includes a parking lock gear 108 fixed to a rotation shaft of transmission 82, and a parking lock pole 106 for locking parking lock gear 108. Although a configuration in which parking lock mechanism 200 is provided within transmission 82 is described in the present embodiment, parking lock mechanism 200 may be provided in any location as long as parking lock mechanism 200 is provided at the rotation shaft between drive wheel 74 and transmission 82.

Parking lock gear 108 has a disc shape and is provided with a plurality of gear teeth 204 along the direction of rotation of the rotation shaft. Parking lock pole 106 is supported by a case of transmission 82 such that one end thereof can be freely rotated. A protrusion 208 meshing with gear teeth 204 of parking lock gear 108 is provided in the center of parking lock pole 106. At the other end of parking lock pole 106, a parking lock cam 210 is provided to abut parking lock pole 106.

FIG. 2 shows the state in which the shift position is in the non-P position. In this state, parking lock pole 106 does not lock parking lock gear 108, and therefore, the rotation of the drive shaft of the vehicle is not limited. If shaft 102 is turned clockwise from this state by actuator 42, rod 104 is pushed by detent plate 100 in the direction of an arrow A shown in FIG. 2, and parking lock pole 106 is pushed up by tapered parking lock cam 210 provided at the tip of rod 104, in the direction of an arrow B shown in FIG. 2. With the rotation of detent plate 100, roller 112 of detent spring 110 situated in one of the two troughs provided at the top of detent plate 100, that is, in the location 120 of the non-P position, climbs over a crest 122 and moves to the other trough, that is, to the location 124 of the P position. Roller 112 is provided at detent spring 110 to be capable of rotating in the axial direction of roller 112. When detent plate 100 rotates until roller 112 reaches the location 124 of the P position, parking lock pole 106 is pushed up to the location where protrusion 208 of parking lock pole 106 meshes with a region between the gear teeth of parking lock gear 108. In this way, parking lock mechanism 200 is brought to an effectively operating state, and thereby the rotation of the drive shaft of the vehicle is mechanically limited and the operation of selecting the P position is completed.

P-ECU 52 causes actuator 42 to be driven such that the P position is selected by shift position selecting mechanism 48, based on the P command signal from HV-ECU 50. In addition, P-ECU 52 causes actuator 42 to be driven such that the non-P position is selected by shift position selecting mechanism 48, based on the NP command signal from HV-ECU 50.

In order to reduce the load applied to the components of shift position selecting mechanism 48 such as detent plate 100, detent spring 110 and shaft 102 at the time of selection of the shift position, P-ECU 52 controls the amount of rotation of actuator 42 to lessen the impact when roller 112 climbs over crest 122 and falls.

A plane located on the side distant from crest 122 in each trough of detent plate 100 is referred to as a wall. In other words, the wall is in a location where roller 112 hits the wall when roller 112 climbs over crest 122 and falls to the trough without control by P-ECU 52 that will be described hereinafter. The wall in the location 124 of the P position is referred to as a P wall 132, and the wall in the location 120 of the non-P position is referred to as a non-P wall 130.

It is noted that, if an automatic transmission is mounted on vehicle 10, detent plate 100 may be coupled to a spool valve of a manual valve of the automatic transmission via a rod and the like.

In the above-described configuration of the vehicle, in the present embodiment, PM-ECU 60 transmits the auto-P request signal to HV-ECU 50 when receiving an instruction to shut off the power supply from the driver.

When receiving the auto-P request signal, HV-ECU 50 transmits the P command signal to P-ECU 52. In addition, when receiving the auto-P request signal, HV-ECU 50 prohibits the selection of the non-P position based on the driver's instruction.

When receiving the P command signal, P-ECU 52 controls actuator 42 such that the P position is selected by shift position selecting mechanism 48. When determining that the selection of the P position by shift position selecting mechanism 48 is completed, P-ECU 52 transmits a P detection signal to HV-ECU 50.

When receiving the P detection signal from P-ECU 52, HV-ECU 50 transmits an auto-P completion signal to PM-ECU 60.

When receiving the auto-P completion signal, PM-ECU 60 cuts off IG relay 68, ACC relay 70 and IGCT relay 86 to shut off the electric power supply from power supply 84 to the electrical equipment to be supplied with the electric power.

The vehicle that has stopped on the hill and the like, however, may move after the operation of selecting the P position starts. In this case, the rotation of the drive wheel does not result in the effectively operating state of the parking lock mechanism, and the operation of selecting the P position is not completed in some cases. Thus, the driver's operation of selecting the shift position is not accepted unless the operation of selecting the P position is completed, and the shift position suited to the driver's intention cannot be selected in some cases.

Hence, the present embodiment is characterized in that, if the selection of the non-P position is prohibited and if it is determined that parking lock mechanism 200 is not in the effectively operating state, HV-ECU 50 permits the selection of the non-P position based on the driver's instruction.

Specifically, if HV-ECU 50 determines that parking lock mechanism 200 is not in the effectively operating state before a predetermined time period has elapsed since the shutoff instruction was received, HV-ECU 50 permits the selection of a shift position different from the P position based on the driver's instruction.

In addition, if control of actuator 42 starts and if the speed of vehicle 10 is greater than a predetermined speed, HV-ECU 50 determines that parking lock mechanism 200 is not in the effectively operating state.

Figure 3:
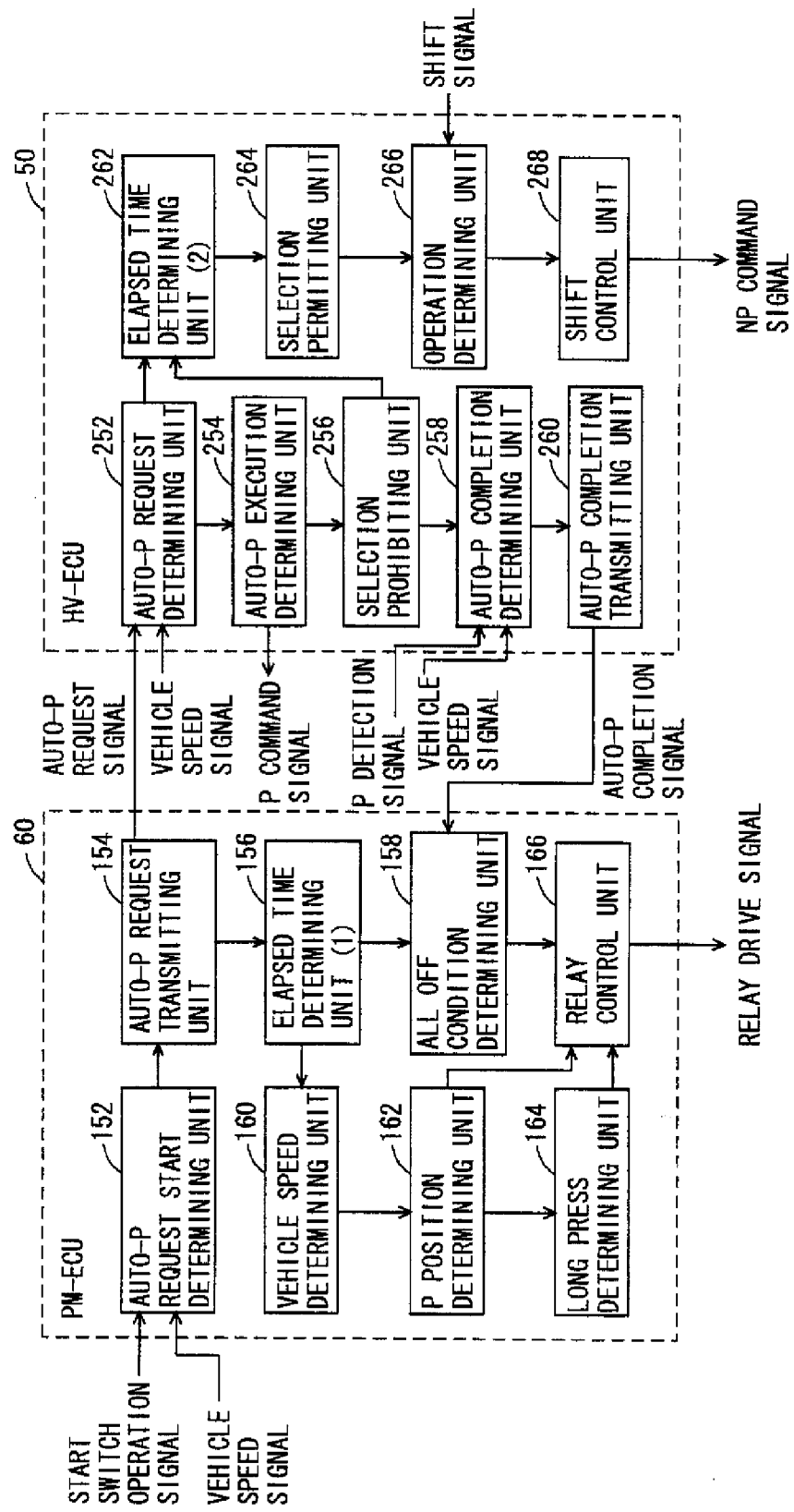
FIG. 3 is a functional block diagram of an HV-ECU and a PM-ECU serving as the control apparatus for the vehicle according to the present embodiment.

FIG. 3 shows a functional block diagram of PM-ECU 60 and HV-ECU 50 serving as the control apparatus for the vehicle according to the present embodiment.

PM-ECU 60 includes an auto-P request start determining unit 152, an auto-P request transmitting unit 154, an elapsed time determining unit (1) 156, an all OFF condition determining unit 158, a vehicle speed determining unit 160, a P position determining unit 162, a long press determining unit 164, and a relay control unit 166.

Auto-P request start determining unit 152 determines whether or not an auto-P request start condition is satisfied. The auto-P request start condition includes a condition that the operation signal indicating the instruction to stop the system of vehicle 10 is received from start switch 62, and a condition that vehicle speed V is less than or equal to predetermined speed Va. Predetermined speed Va is not particularly limited if predetermined speed Va is, for example, a speed indicating that the vehicle is in the stopped state. It is noted that, if the auto-P request start condition is satisfied, auto-P request start determining unit 152 may turn on a start determination flag.

If the auto-P request start condition is satisfied, auto-P request transmitting unit 154 transmits the auto-P request signal to HV-ECU 50. It is noted that, if the start determination flag is turned on, for example, auto-P request transmitting unit 154 may transmit the auto-P request signal to HV-ECU 50.

Elapsed time determining unit (1) 156 determines whether or not a time period greater than or equal to a predetermined time period Ta has elapsed since the auto-P request signal was transmitted. The time period that has elapsed since the auto-P request signal was transmitted is measured by a timer unit (not shown) that is separately provided.

It is noted that, if the time period greater than or equal to predetermined time period Ta has elapsed since the auto-P request signal was transmitted, for example, elapsed time determining unit (1) 156 may turn on an elapsed time determination flag (1).

All OFF condition determining unit 158 determines whether or not an all OFF condition for turning off both IG relay 68 and ACC relay 70 is satisfied before predetermined time period Ta has elapsed since the auto-P request signal was transmitted. The all OFF condition is a condition that vehicle speed V is less than or equal to predetermined speed Va and that the auto-P completion signal is received from HV-ECU 50. All OFF condition determining unit 158 may determine whether or not the all OFF condition is satisfied if the elapsed time determination flag (1) is OFF, and may turn on an all OFF condition satisfaction flag if all OFF condition determining unit 158 determines that the all OFF condition is satisfied.

If the time period greater than or equal to predetermined time period Ta has elapsed, vehicle speed determining unit 160 determines whether or not vehicle speed V is greater than predetermined speed Va. In addition, if the time period greater than or equal to predetermined time period Ta has elapsed and if vehicle speed V is greater than predetermined speed Va, for example, vehicle speed determining unit 160 may turn on a speed determination flag.

If the time period greater than or equal to predetermined time period Ta has elapsed and if vehicle speed V is less than or equal to predetermined speed Va, P position determining unit 162 determines whether or not the shift position is in the P position. If the auto-P completion signal is received from HV-ECU 50, for example, P position determining unit 162 determines that the shift position is in the P position.

It is noted that P position determining unit 162 may determine whether or not the shift position is in the P position, if the elapsed time determination flag (1) is ON and if the speed determination flag is OFF, for example, and may turn on a P position determination flag if P position determining unit 162 determines that the shift position is in the P position.

If the time period greater than or equal to predetermined time period Ta has elapsed and if vehicle speed V is greater than predetermined speed Va, long press determining unit 164 determines whether or not start switch 62 is in the long pressed state. If the time period during which the driver presses start switch 62 is greater than or equal to a predetermined time period, long press determining unit 164 determines that start switch 62 is in the long pressed state.

It is noted that long press determining unit 164 may determine whether or not start switch 62 is in the long pressed state, if the elapsed time determination flag (1) is ON and if the speed determination flag is ON, for example, and may turn on a long press determination flag if start switch 62 is in the long pressed state.

If all OFF condition determining unit 158 determines that the all OFF condition is satisfied, relay control unit 166 transmits the relay drive signal to power supply relay 66 to turn off both IG relay 68 and ACC relay 70.

If the all OFF condition determination flag is ON, for example, relay control unit 166 may transmit the relay drive signal to power supply relay 66 to turn off IG relay 68 and ACC relay 70.

In addition, if the time period greater than or equal to predetermined time period Ta has elapsed and if vehicle speed V is less than or equal to predetermined speed Va, relay control unit 166 transmits the relay drive signal to power supply relay 66 to turn off both IG relay 68 and ACC relay 70 when the shift position is in the P position.

If the elapsed time determination flag (1), the speed determination flag and the P position determination flag are all ON, for example, relay control unit 166 may transmit the relay drive signal to power supply relay 66 to turn off IG relay 68 and ACC relay 70.

Furthermore, if the time period greater than or equal to predetermined time period Ta has elapsed and if vehicle speed V is less than or equal to predetermined speed Va, relay control unit 166 turns off IG relay 68 and maintains ACC relay 70 in the ON state when the shift position is in the non-P position.

It is noted that the present invention is not limited thereto. The subsequent switching of the shift position may only be possible when the shift position cannot be set to the P position. For example, if the P position determination flag is OFF, both of IG relay 68 and ACC relay 70 may be maintained in the ON state.

If the elapsed time determination flag (1) and the vehicle speed determination flag are ON and if the P position determination flag is OFF, for example, relay control unit 166 may maintain ACC relay 70 in the ON state.

Furthermore, if the time period greater than or equal to predetermined time period Ta has elapsed, if vehicle speed V is greater than predetermined speed Va and if it is determined that start switch 62 is in the long pressed state, relay control unit 166 turns off IG relay 68 and transmits the relay drive signal to power supply relay 66 to maintain ACC relay 70 in the ON state.

If the long press determination flag is ON, for example, relay control unit 166 may turn off IG relay 68 and transmit the relay drive signal to power supply relay 66 to maintain ACC relay 70 in the ON state.

Furthermore, if the time period greater than or equal to predetermined time period Ta has elapsed, if vehicle speed V is greater than predetermined speed Va and if start switch 62 is not in the long pressed state, relay control unit 166 maintains both IG relay 68 and ACC relay 70 in the ON state.

If the elapsed time determination flag (1) and the vehicle speed determination flag are ON and if the long press determination flag is OFF, for example, relay control unit 166 may maintain both IG relay 68 and ACC relay 70 in the ON state.

Although in the present embodiment auto-P request start determining unit 152, auto-P request transmitting unit 154, elapsed time determining unit (1) 156, all OFF condition determining unit 158, vehicle speed determining unit 160, P position determining unit 162, long press determining unit 164, and relay control unit 166 are all described as those functioning as software that are implemented by a CPU of PM-ECU 60 performing a program stored in a memory, they may be implemented by hardware. It is noted that such program is stored in a storage medium and mounted on the vehicle.

HV-ECU 50 includes an auto-P request determining unit 252, an auto-P execution determining unit 254, a selection prohibiting unit 256, an auto-P completion determining unit 258, an auto-P completion transmitting unit 260, an elapsed time determining unit (2) 262, a selection permitting unit 264, an operation determining unit 266, and a shift control unit 268.

Auto-P request determining unit 252 determines whether or not auto-P request determining unit 252 receives the auto-P request signal from PM-ECU 60. It is noted that, if auto-P request determining unit 252 receives the auto-P request signal from PM-ECU 60, for example, auto-P request determining unit 252 may turn on an auto-P request determination flag.

Auto-P execution determining unit 254 determines whether or not a condition for executing the auto-P control is satisfied. The condition for executing the auto-P control includes a condition that auto-P request determining unit 252 receives the auto-P request signal from PM-ECU 60, and a condition that vehicle speed V is less than or equal to predetermined speed Va. If auto-P execution determining unit 254 determines that the condition for executing the auto-P control is satisfied, auto-P execution determining unit 254 transmits the P command signal to P-ECU 52. If auto-P execution determining unit 254 determines that the condition for executing the auto-P control is satisfied, for example, auto-P execution determining unit 254 may turn on an auto-P execution flag.

Since the operation of P-ECU 52 based on the P command signal is as described above, the detailed description thereof will not be repeated. When the operation of selecting the P position by shift position selecting mechanism 48 is completed, P-ECU 52 transmits the P detection signal to HV-ECU 50.

Selection prohibiting unit 256 prohibits the determination of the shifting operation. In other words, selection prohibiting unit 256 prohibits the selection of the non-P position by shift position selecting mechanism 48. If the auto-P execution flag in turned on, for example, selection prohibiting unit 256 may prohibit the determination of the shifting operation.

Auto-P completion determining unit 258 determines whether or not an auto-P completion determination condition is satisfied. The auto-P completion determination condition includes a condition that the operation of selecting the P position by shift position selecting mechanism 48 is completed after the P command signal is transmitted, and a condition that vehicle speed V is less than or equal to predetermined speed Va.

It is noted that, if auto-P completion determining unit 258 receives the P detection signal, auto-P completion determining unit 258 can determine that the condition that the operation of selecting the P position is completed is satisfied.

It is noted that, if auto-P completion determining unit 258 determines that the auto-P completion determination condition is satisfied, for example, auto-P completion determining unit 258 may turn on an auto-P completion determination flag.

If it is determined that the auto-P completion determination condition is satisfied, auto-P completion transmitting unit 260 generates the auto-P completion signal and transmits the generated auto-P completion signal to PM-ECU 60.

It is noted that, if the auto-P completion determination flag is ON, for example, auto-P completion transmitting unit 260 may generate the auto-P completion signal and transmit the generated auto-P completion signal to PM-ECU 60.

Elapsed time determining unit (2) 262 determines whether or not the time period that has elapsed since the auto-P request signal was received is greater than or equal to a predetermined time period Tb. The time period that has elapsed since the auto-P request signal was received is measured by the timer unit (not shown) that is separately provided.

It is noted that, if the time period greater than or equal to predetermined time period Tb has elapsed since the auto-P request signal was transmitted, for example, elapsed time determining unit (2) 262 may turn on an elapsed time determination flag (2).

If the time period greater than or equal to predetermined time period Tb has elapsed and if the determination of the shifting operation is prohibited, selection permitting unit 264 clears the prohibition and permits the determination of the shifting operation. In other words, selection permitting unit 264 permits the selection of the non-P position.

It is noted that, if the elapsed time determination flag (2) is turned on, selection permitting unit 264 may turn off the auto-P execution flag and permit the determination of the shifting operation.

When the determination of the shifting operation is permitted, operation determining unit 266 determines whether or not the shifting operation is performed, based on the shift signal. If operation determining unit 266 determines that the shifting operation is performed, shift control unit 268 causes actuator 42 to be driven such that shift position selecting mechanism 48 selects the shift position selected by the driver's shifting operation. If the non-P position is selected by the driver's shifting operation, shift control unit 268 transmits the NP command signal to P-ECU 52.

After receiving the NP command signal, P-ECU 52 starts control of actuator 42. P-ECU 52 calculates the amount of rotation of actuator 42 based on a count signal from encoder 46. Based on the calculated amount of rotation, P-ECU 52 causes actuator 42 to be driven until detent plate 100 rotates to a location corresponding to the non-P position.

Although in the present embodiment auto-P request determining unit 252, auto-P execution determining unit 254, selection prohibiting unit 256, auto-P completion determining unit 258, auto-P completion transmitting unit 260, elapsed time determining unit (2) 262, selection permitting unit 264, operation determining unit 266, and shift control unit 268 are all described as those functioning as software that are implemented by a CPU of HV-ECU 50 performing a program stored in the memory, they may be implemented by hardware. It is noted that such program is stored in the storage medium and mounted on the vehicle.

Figure 4:
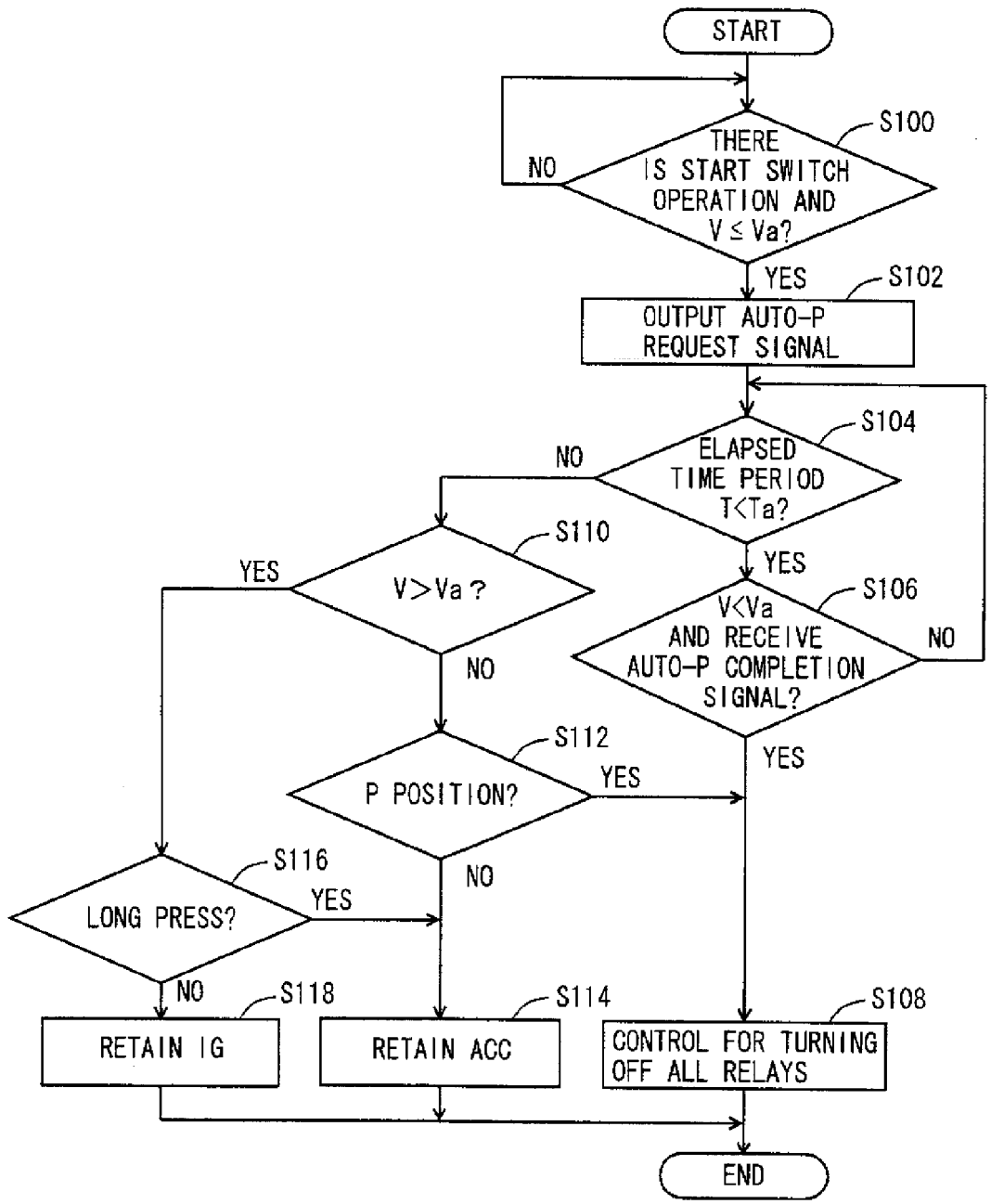
FIG. 4 is a flowchart illustrating a control structure of a program running on the PM-ECU.

A control structure of the program running on PM-ECU 60 in the control apparatus for the vehicle according to the present embodiment will be described with reference to FIG. 4.

In step (that will be described as "S" hereinafter) 100, PM-ECU 60 determines whether or not vehicle speed V is less than or equal to predetermined speed Va and the driver operates start switch 62 while the system of vehicle 10 is active. If vehicle speed V is less than or equal to predetermined speed Va and the driver operates start switch 62 while the system of vehicle 10 is active (YES in S100), the process proceeds to S102. If not (NO in S100), the process returns to S100.

In S102, PM-ECU 60 transmits the auto-P request signal to HV-ECU 50. In S104, PM-ECU 60 determines whether or not a time period T that has elapsed since the auto-P request signal was transmitted is smaller than predetermined time period Ta. If elapsed time period T is smaller than predetermined time period Ta (YES in S104), the process proceeds to S106. If not (NO in S104), the process proceeds to S110.

In S106, PM-ECU 60 determines whether or not vehicle speed V is smaller than pre-determined speed Va and PM-ECU 60 receives the auto-P completion signal. If vehicle speed V is smaller than predetermined speed Va and PM-ECU 60 receives the auto-P completion signal (YES in S106), the process proceeds to S108. If not (NO in S106), the process returns to S104.

In S108, PM-ECU 60 controls power supply relay 66 to turn off both IG relay 68 and ACC relay 70.

In S110, PM-ECU 60 determines whether or not vehicle speed V is greater than pre-determined speed Va. If vehicle speed V is greater than predetermined speed Va (YES in S110), the process proceeds to S116. If not (NO in S110), the process proceeds to S112.

In S112, PM-ECU 60 determines whether or not the shift position is in the P position. If the shift position is in the P position (YES in S112), the process proceeds to S108. If not (NO in S112), the process proceeds to S114.

In S114, PM-ECU 60 transmits the relay drive signal to power supply relay 66 to turn off IG relay 68 and maintain ACC relay 70 in the ON state. In S116, PM-ECU 60 determines whether or not start switch 62 is in the long pressed state. If start switch 62 is in the long pressed state (YES in S116), the process proceeds to S114. If not (NO in S116), the process proceeds to S118.

In S118, PM-ECU 60 maintains IG relay 68 and ACC relay 70 in the ON state.

Figure 5:
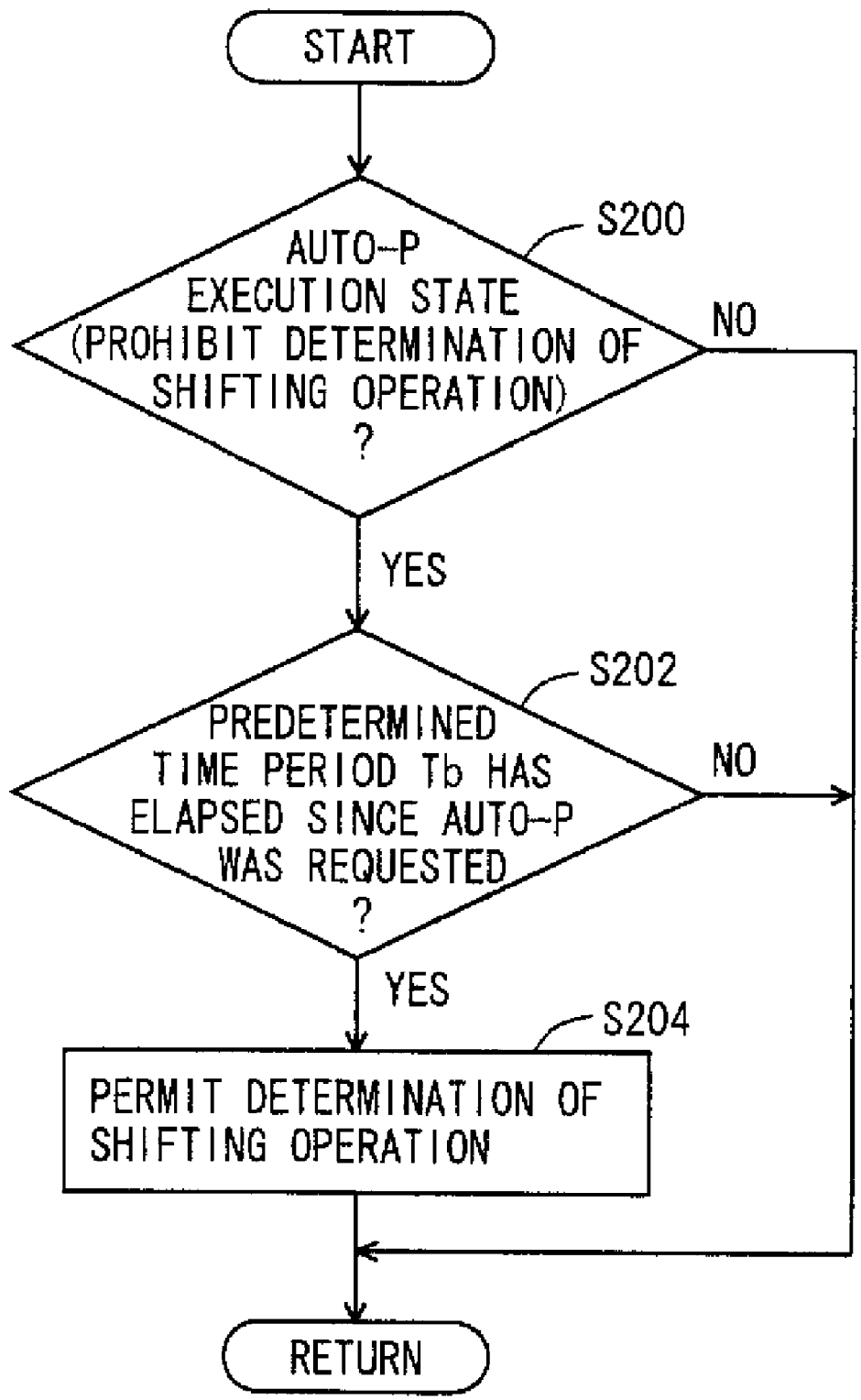
FIG. 5 is a flowchart illustrating a control structure of a program running on the HV-ECU.

Next, a control structure of the program running on HV-ECU 50 in the control apparatus for the vehicle according to the present embodiment will be described with reference to FIG. 5.

In S200, HV-ECU 50 determines whether or not HV-ECU 50 is in the auto-P execution state. Specifically, if the condition for executing the auto-P control is satisfied, HV-ECU 50 determines that HV-ECU 50 is in the auto-P execution state. If HV-ECU 50 is in the auto-P execution state (YES in S200), the process proceeds to S202. If not (NO in S200), this process ends.

In S202, HV-ECU 50 determines whether or not the time period greater than or equal to predetermined time period Tb has elapsed since the auto-P request signal was received. If the time period greater than or equal to predetermined time period Tb has elapsed since the auto-P request signal was received (YES in S202), the process proceeds to S204. If not (NO in S202), this process ends.

In S204, HV-ECU 50 permits the determination of the shifting operation. HV-ECU 50 returns from the auto-P execution state to the normal state and permits the shifting operation by the driver. Thus, HV-ECU 50 determines whether or not the shifting operation is performed, based on the shift signal, and if it is determined that the shifting operation is performed, HV-ECU 50 causes actuator 42 to be driven such that shift position selecting mechanism 48 selects the shift position selected by the driver's shifting operation.

The operation of the control apparatus for the vehicle according to the present embodiment based on the structures and the flowcharts as described above will be described with reference to FIG. 6.

For example, assume that the system of vehicle 10 is active, the non-P position is selected and the vehicle is stopping.

Figure 6:
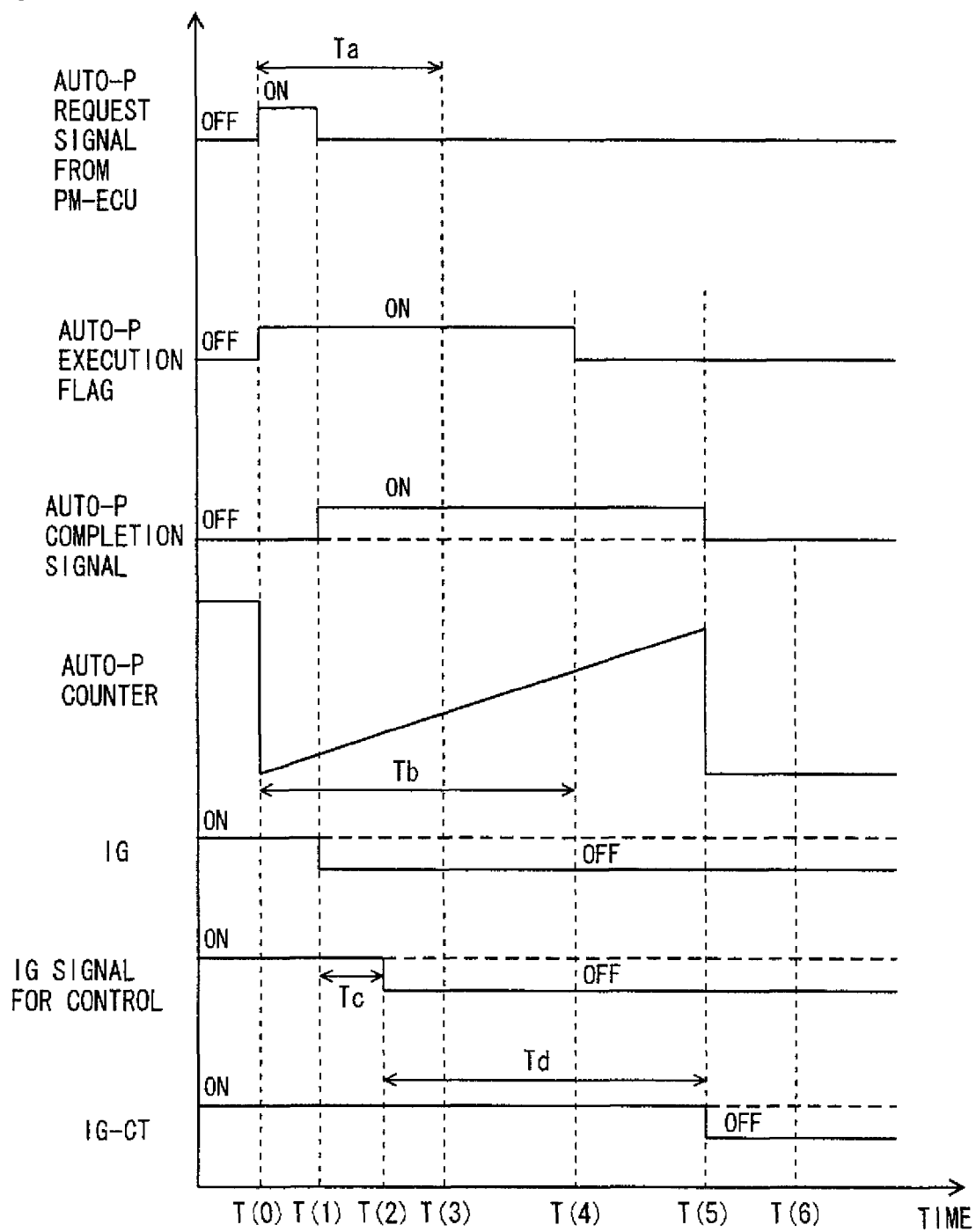
FIG. 6 is a timing chart illustrating the operation of the control apparatus for the vehicle according to the present embodiment.

At time T (0), if it is determined that the instruction to stop the system of vehicle 10 is received as a result of the driver's operation of start switch 62 and if vehicle speed V is less than or equal to predetermined speed Va (YES in S100), the auto-P request signal is transmitted from PM-ECU 60 to HV-ECU 50 as indicated by a solid line in FIG. 6 (S102).

If HV-ECU 50 receives the auto-P request signal (YES in S200) and the condition for executing the auto-P control is satisfied, HV-ECU 50 transmits the P command signal to P-ECU 52, and in addition, turns on the auto-P execution flag and starts measuring the time period that has elapsed since the auto-P request signal was received. The auto-P execution flag is turned on, and in addition, the determination of the shifting operation is prohibited. Thus, even if the driver performs the shifting operation, the operation of selecting the P position continues.

When receiving the P command signal, P-ECU 52 causes actuator 42 to be driven such that the P position is selected by shift position selecting mechanism 48. When the operation of selecting the P position is completed, P-ECU 52 transmits the P detection signal to HV-ECU 50.

At time T (1), when receiving the P detection signal, HV-ECU 50 transmits the auto-P completion signal to PM-ECU 60. If vehicle speed V is smaller than predetermined speed Va and if PM-ECU 60 receives the auto-P completion signal (YES in S106), before the time period greater than or equal to predetermined time period Ta has elapsed (YES in S104), PM-ECU 60 controls power supply relay 66 to turn off IG relay 68 and ACC relay 70 (S108).

When the control for turning off IG relay 68 and ACC relay 70 is executed, IG relay 68 and ACC relay 70 are turned off at time T (1), respectively. Then, at time T (2) after a predetermined time period Tc has elapsed, the IG signal for control of P-ECU 52 is turned off. Furthermore, at time T (5) after a predetermined time period Td has elapsed since the IG signal for control was turned off, IGCT relay 86 is turned off and the electric power supplied to P-ECU 52 is shut off.

On the other hand, if the time period that has elapsed since the auto-P request signal was received is greater than or equal to predetermined time period Tb (YES in S202), the determination of the shifting operation is permitted at time T (4) (S204). At this time, IG relay 68 and the IG signal for control are both turned off, and even if the auto-P execution flag is turned off, the electric power supply from power supply 84 is shut off and the system of vehicle 10 stops after time T (4).

On the other hand, as indicated by a dashed line in FIG. 6, if vehicle speed V is greater than or equal to predetermined speed Va after reception of the auto-P request signal at time T (1) (NO in S104), it is again determined whether or not vehicle speed V is greater than predetermined speed Va, at time T (3) after predetermined time period Ta has elapsed (S110).

At this time, if vehicle speed V is less than or equal to predetermined speed Va (NO in S110) and if the P position is not selected by shift position selecting mechanism 48 yet (NO in S112), IG relay 68 is turned off and ACC relay 70 is maintained in the ON state (S114). Alternatively, if vehicle speed V is greater than predetermined speed Va (YES in S110) and if start switch 62 is not in the long pressed state (NO in S116), IG relay 68 is maintained in the ON state (S118).

Since the P position is not selected yet, the auto-P completion signal is in the OFF state, and IG relay 68, ACC relay 70, the IG signal for control, and IGCT relay 86 are all maintained in the ON state.

Thus, at time T (4), if the time period that has elapsed since the auto-P request signal was received is greater than or equal to predetermined time period Tb (YES in S202), the determination of the shifting operation is permitted (S204), and therefore, if the non-P position is selected by the driver's shifting operation, for example, HV-ECU 50 transmits the NP command signal to P-ECU 52. When receiving the NP command signal, P-ECU 52 causes actuator 42 to be driven such that the non-P position is selected by shift position selecting mechanism 48.

As described above, in the control apparatus for the vehicle according to the present embodiment, even if the operation of selecting the P position is not completed, the driver can select the non-P position by permitting the selection of the non-P position based on the driver's instruction if the selection of the non-P position is prohibited and if it is determined that the parking lock mechanism is not in the effectively operating state. Thus, the driver can clear the P position when the power supply is not shut off. Accordingly, there can be provided a control apparatus for a vehicle and a method for controlling a vehicle that allow the selection of the shift position suited to the driver's intention, when the power supply is not shut off because the operation of selecting the parking position is not completed.

It is noted that, in the present embodiment, it has been described that the prohibition of the selection of the non-P position is cleared if the time period greater than or equal to predetermined time period Tb has elapsed since the auto-P request signal was received. A condition for starting the control according to the present invention, however, is not particularly limited to the condition that the time period greater than or equal to predetermined time period Tb has elapsed since the auto-P request signal was received. For example, a condition that it is detected that IG relay 68 and ACC relay 70 cannot be turned off before the predetermined time period has elapsed since the auto-P request signal was received may be used as the condition for starting the control.

In addition, in the present embodiment, it has been described that PM-ECU 60, HV-ECU 50 and P-ECU 52 cooperate to implement the operation of the control apparatus for the vehicle according to the present invention. For example, however, PM-ECU 60, HV-ECU 50 and P-ECU 52 may be integrated into one ECU and the integrated ECU may implement the operation of the control apparatus for the vehicle according to the present invention as indicated by a dashed frame in FIG. 1. Alternatively, any two of PM-ECU 60, HV-ECU 50 and P-ECU 52 may be integrated, and the integrated ECU and the other ECU may cooperate to implement the operation of the control apparatus for the vehicle according to the present invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control apparatus for a vehicle including a drive wheel, a shift position selecting mechanism for selecting any one of a plurality of shift positions including a parking position by driving an actuator, a parking lock mechanism for limiting rotation of said drive wheel if said parking position is selected by said shift position selecting mechanism, electrical equipment, and a power supply for supplying electric power to said electrical equipment, comprising:
    a power supply shutoff unit for shutting off electric power supply from said power supply to said electrical equipment if a shutoff instruction for said power supply is received and if said parking lock mechanism is in an effectively operating state;
    an actuator control unit for controlling said actuator such that said parking position is selected by said shift position selecting mechanism if said shutoff instruction is received;
    a prohibiting unit for prohibiting selection of a shift position different from said parking position based on an instruction from a driver, if said shutoff instruction is received;
    a lock determining unit for determining whether or not said parking lock mechanism is in the effectively operating state, if said shutoff instruction is received; and
    a permitting unit for permitting selection of the shift position different from said parking position based on the instruction from said driver, if selection of the shift position different from said parking position is prohibited by said prohibiting unit and if it is determined that said parking lock mechanism is not in the effectively operating state.

2. The control apparatus for the vehicle according to claim 1, wherein
    said permitting unit permits selection of the shift position different from said parking position based on the instruction from said driver, if said lock determining unit determines that said parking lock mechanism is not in the effectively operating state before a predetermined time period has elapsed since said shutoff instruction was received.

3. The control apparatus for the vehicle according to claim 1, further comprising
    a shutoff determining unit for determining whether or not the shutoff instruction for said power supply is received from said driver.

4. The control apparatus for the vehicle according to claim 1, wherein
    said lock determining unit determines that said parking lock mechanism is not in the effectively operating state, if control of said actuator is initiated by said actuator control unit and if a speed of said vehicle is greater than a predetermined speed.

5. A method for controlling a vehicle including a drive wheel, a shift position selecting mechanism for selecting any one of a plurality of shift positions including a parking position by driving an actuator a parking lock mechanism for limiting rotation of said drive wheel if said parking position is selected by said shift position selecting mechanism, electrical equipment, and a power supply for supplying electric power to said electrical equipment, comprising the steps of:
    shutting off electric power supply from said power supply to said electrical equipment if a shutoff instruction for said power supply is received and if said parking lock mechanism is in an effectively operating state;
    controlling said actuator such that said parking position is selected by said shift position selecting mechanism if said shutoff instruction is received;
    prohibiting selection of a shift position different from said parking position based on an instruction from a driver, if said shutoff instruction is received;
    determining by a processor whether or not said parking lock mechanism is in the effectively operating state, if said shutoff instruction is received; and
    permitting selection of the shift position different from said parking position based on the instruction from said driver, if selection of the shift position different from said parking position is prohibited and if it is determined that said parking lock mechanism is not in the effectively operating state.

6. The method for controlling the vehicle according to claim 5, wherein
    in the step of permitting selection of the shift position different from said parking position, selection of the shift position different from said parking position based on the instruction from said driver is permitted if it is determined by the processor that said parking lock mechanism is not in the effectively operating state before a predetermined time period has elapsed since said shutoff instruction was received.

7. The method for controlling the vehicle according to claim 5, further comprising the step of determining by the processor whether or not the shutoff instruction for said power supply is received from said driver.

8. The method for controlling the vehicle according to claim 5, wherein in the step of determining by the processor whether or not said parking lock mechanism is in the effectively operating state, it is determined that said parking lock mechanism is not in the effectively operating state if control of said actuator is initiated in the step of controlling said actuator and if a speed of said vehicle is greater than a predetermined speed.

\* \* \* \* \*